United States Patent
Lim (10) Patent No.: US 9,183,414 B2
(45) Date of Patent: Nov. 10, 2015

(54) MEMORY CONTROLLER AND MEMORY DEVICE INCLUDING THE MEMORY CONTROLLER

(75) Inventor: Min-soo Lim, Hwaseong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 1687 days.

(21) Appl. No.: 12/391,521

(22) Filed: Feb. 24, 2009

(65) Prior Publication Data

US 2009/0262940 A1 Oct. 22, 2009

(30) Foreign Application Priority Data

Feb. 29, 2008 (KR) .................. 10-2008-0019305

(51) Int. Cl.
  G06F 11/30 (2006.01)
  G06F 21/78 (2013.01)
  G06F 12/14 (2006.01)
  G06F 21/57 (2013.01)

(52) U.S. Cl.
  CPC ............ *G06F 21/78* (2013.01); *G06F 12/1408* (2013.01); *G06F 21/575* (2013.01)

(58) Field of Classification Search
  CPC ............... G11B 20/00086; G11B 20/00115; G11B 20/0021; G11B 20/00231; G11B 20/00246; G11B 20/00253; G11B 20/00449; G11B 20/00659; H04L 2209/56; H04L 2209/60; H04L 9/3236; G06F 21/78
  USPC .................................. 713/189, 193
  See application file for complete search history.

(56) References Cited

U.S. PATENT DOCUMENTS

| 6,694,106 | B2 | 2/2004 | Yoshimura |
| 7,984,511 | B2 | 7/2011 | Kocher et al. |
| 7,987,510 | B2 | 7/2011 | Kocher et al. |
| 7,996,913 | B2 | 8/2011 | Kocher et al. |
| 8,055,910 | B2 | 11/2011 | Kocher et al. |
| 8,131,646 | B2 | 3/2012 | Kocher et al. |
| 8,571,993 | B2 | 10/2013 | Kocher et al. |
| 2004/0133794 | A1* | 7/2004 | Kocher et al. .................. 713/193 |
| 2007/0026371 | A1* | 2/2007 | Wood ............................ 434/317 |
| 2007/0041583 | A1* | 2/2007 | Boneh et al. .................... 380/28 |
| 2007/0110227 | A1* | 5/2007 | Yokouchi ........................ 380/28 |
| 2007/0245402 | A1 | 10/2007 | Kim |
| 2011/0264923 | A1 | 10/2011 | Kocher et al. |

FOREIGN PATENT DOCUMENTS

| JP | 2000-029790 | 1/2000 |
| JP | 2000-353226 | 12/2000 |
| JP | 2002-36008 | 12/2002 |
| JP | 2005-209108 | 8/2005 |
| KR | 1020060031681 | 4/2006 |
| KR | 1020060071572 | 6/2006 |
| KR | 1020070103117 | 10/2007 |

* cited by examiner

*Primary Examiner* — Dant Shaifer Harriman
*Assistant Examiner* — Abiy Getachew
(74) *Attorney, Agent, or Firm* — F. Chau & Associates, LLC (57) ABSTRACT

A memory controller includes a security key and parameter storage unit and a security engine. The security key and parameter storage unit stores at least one security key and at least one parameter that are used during encryption or decryption. The security engine receives encrypted data stored in an external boot memory, decrypts the received encrypted data by using the security key and the parameter, and outputs the decrypted data to a central processing unit (CPU), in a security operation mode.

19 Claims, 6 Drawing Sheets

MEMORY CONTROLLER AND MEMORY DEVICE INCLUDING THE MEMORY CONTROLLER

CROSS-REFERENCE TO RELATED APPLICATIONS

This application claims priority to Korean Patent Application No. 10-2008-0019305, filed on Feb. 29, 2008, in the Korean Intellectual Property Office, the disclosure of which is incorporated by reference in its entirety herein.

BACKGROUND

1. Technical Field

The present disclosure relates to a memory controller and a memory device, and more particularly, to a memory controller providing high security performance and a memory device including the memory controller.

2. Discussion of Related Art

Security and protection of stored data in a memory device are of great importance. For example, it is desirable to prevent unauthorized people from accessing, leaking, or falsifying stored data. Boot data used to execute a program may be stored in an external memory. A central processing unit (CPU) may read the boot data from the external memory by using a memory controller and execute a program corresponding to the stored boot data. However, if the boot data is falsified before it is used, the security of a system can be compromised.

Figure 1:
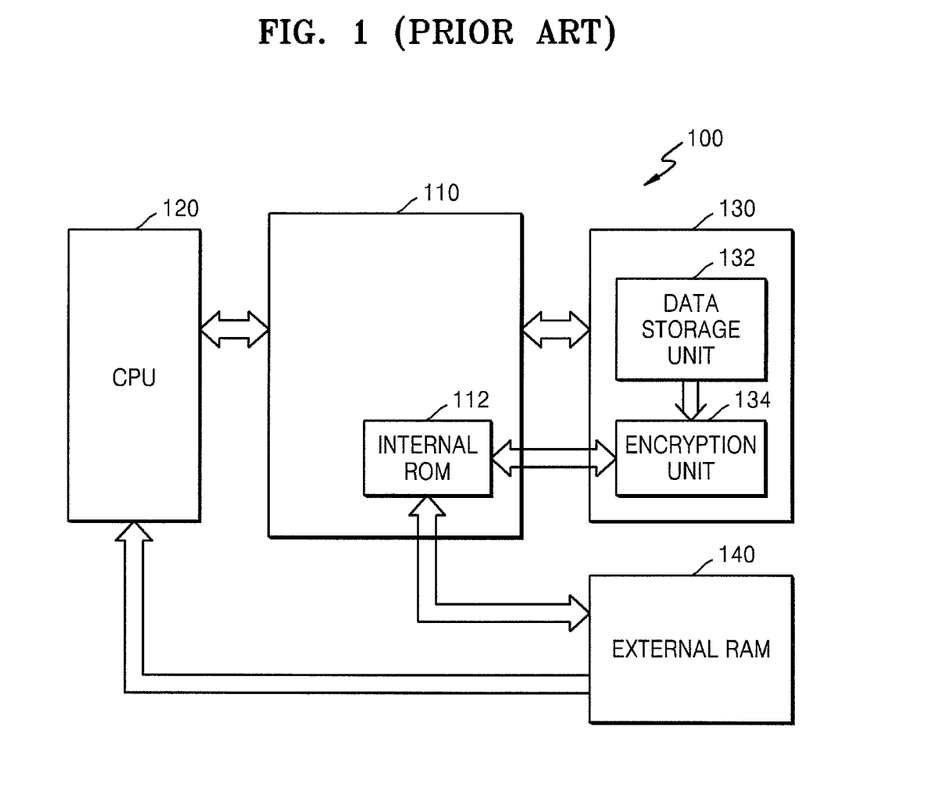
FIG. 1 illustrates a conventional memory device having a security function.

FIG. 1 illustrates a conventional memory device 100 that includes a security function. Referring to FIG. 1, the memory device 100 includes a CPU 120, a memory controller 110, and an external memory 130. The external memory 130 stores a boot code. The external memory 130 is disposed separately from the CPU 120 and the memory controller 110.

The CPU 120 makes a request to the memory controller 110 for the boot code stored in the external memory 130. The CPU 120 boots a specific processor or program by using the boot code received in response to the request. The external memory 130 includes a data storage unit 132 and an encryption unit 134. The data storage unit 132 stores the above-described boot code. Data stored in the data storage unit 132 is not encrypted. The encryption unit 134 encrypts the boot code stored in the data storage unit 132.

When the CPU 120 requests the boot code, the external memory 130 outputs the encrypted boot code to the memory controller 110. An internal ROM 112 of the memory controller 110 decrypts the encrypted boot code output by the external memory 130 and outputs the decrypted boot code to an external RAM 140.

The internal ROM 112 checks whether encrypted boot data or an encrypted boot code has been falsified. The internal ROM 112 stores its own encryption values (hereinafter, referred to as "self-stored encryption values"). When the internal ROM 112 receives encrypted data from the external memory 130, it searches for a self-stored encryption value corresponding to the received encrypted data. When the internal ROM 112 finds the self-stored encryption value, it compares the encrypted value received from the external memory 130 with the found self-stored encryption value.

If the encrypted value received from the external memory 130 is identical to the found self-stored encryption value, the internal ROM 112 determines that the boot data or boot code stored in the data storage unit 132 of the external memory 130 is authentic. However, if the encrypted value received from the external memory 130 is not identical to the found self-stored encryption value, the internal ROM 112 determines that the boot data or boot code stored in the data storage unit 132 of the external memory 130 has been falsified. The internal ROM 112 only determines whether the boot data or boot code stored in the data storage unit 132 of the external memory 130 has been falsified, and does not encrypt the data stored in the data storage unit 132.

After the internal ROM 112 determines that the boot data or boot code stored in the data storage unit 132 is authentic, the CPU 120 initiates a booting operation by using the boot code stored in the external memory 130. The CPU 120 decrypts the encrypted boot data or boot code received from the external memory 130. Then, the CPU 120 transmits the decrypted boot code to an external RAM 140. The CPU 120 randomly accesses the external RAM 140 and reads decrypted data or a program code from the external RAM 140. The CPU 120 performs a specific program by using the read-out data.

Data output by the external RAM 140 is decrypted data, and thus unencrypted data is directly output. Accordingly, ill-intentioned users may extract data from the external RAM 140 and falsify the extracted data. The ill-intentioned users denote people who try to maliciously falsify boot data or a boot code, namely, users who are not allowed to access data.

The external memory 130 is exposed to the outside, and stores unencrypted user data or program codes in the data storage unit 132. Thus, ill-intentioned users may easily access the externally-exposed external memory 130 and falsify the user data or program codes stored in the external memory 130.

When boot data or a boot code needs to be changed due to a change of a processor, encryption values stored in the internal ROM 112 need to be changed. Thus, when a processor change occurs, the internal ROM 112 needs to be replaced.

Thus, there is a need for a memory device that can adaptively protect boot data or a boot code that does not require replacement of an internal ROM.

SUMMARY

An exemplary embodiment of the present invention includes a memory controller having a security key and parameter storage unit and a security engine. The security key and parameter storage unit stores at least one security key and at least one parameter that are used during encryption or decryption. The security engine receives encrypted data stored in an external boot memory, decrypts the received encrypted data by using the at least one security key and the at least one parameter, and outputs the decrypted data to a central processing unit (CPU), in a security operation mode.

The security key and parameter storage unit may select a security key and a parameter and output the selected security key and parameter to the security engine in response to a control signal of the CPU. In the security operation mode, the security engine may encrypt data transmitted from the CPU by using the selected security key and parameter, and output the encrypted data to the external boot memory.

The memory controller may further include a memory interface which performs data transmission and reception together with the external boot memory. The memory controller may further include a bus interface which performs data transmission and reception together with the CPU. The memory controller may further include an internal boot memory which temporarily stores the decrypted data and outputs stored data in units of a data size required by the CPU.

In modes other than the security operation mode, the security engine may receive unencrypted data stored in the external boot memory and transmit the unencrypted data to the CPU. In modes other than the security operation mode, the security engine may transmit unencrypted data transmitted from the CPU and transmit the unencrypted data to the external boot memory.

The security key and parameter storage unit may store a plurality of security keys which differ according to the booting purpose or application program to be executed, and a plurality of parameters which differ according to the booting purpose or the application program to be executed. The security key and parameter storage unit may be a programmable non-volatile memory device.

The security engine may include an encryption module encrypting data transmitted from the CPU and a decryption module decrypting the encrypted data transmitted from the external boot memory. The security engine may determine whether one of the encryption and decryption is performed or not, in response to a control signal of the CPU.

An exemplary embodiment of the present invention includes a memory device having an external boot memory and a memory controller. The external boot memory separately stores one of encrypted data and an encrypted boot code and one of unencrypted data and an unencrypted boot code. In a security operation mode, the memory controller receives the encrypted data or boot code stored in the external boot memory, decrypts the received encrypted data or boot code by using an internally stored security key and an internally stored parameter, and outputs the decrypted data to a CPU.

The external boot memory may include a secure area storing the encrypted data or boot code and a non-secure area storing the unencrypted data or boot code. The memory controller may include a security key and parameter storage unit storing at least one security key and at least one parameter that are used during encryption or decryption; and a security engine receiving the encrypted data or boot code stored in the external boot memory, decrypting the received encrypted data or boot code by using the at least one security key and the at least one parameter, and outputting the decrypted data or boot code to the CPU, in the security operation mode.

An exemplary embodiment of the present invention includes a memory device having a storage unit and a security engine. The storage unit stores a plurality of security keys and parameters. Each parameter corresponds to one of a plurality of programs. The storage unit is configured to select one of the plurality of parameters in response to a control signal and to select one of the plurality of security keys in response to the selected parameter. The security engine is configured to decrypt boot code of a program stored in an external boot memory that corresponds to the selected parameter using the selected security key for output to a central processing unit (CPU).

The security engine may be further configured to encrypt replacement boot code from the CPU using the selected security key and to replace the boot code of the program stored in the external boot memory that corresponds to the selected parameter using the encrypted replacement boot code. The security engine may be further configured to pass the boot code between the CPU and the external boot memory without encryption or decryption.

BRIEF DESCRIPTION OF THE DRAWINGS

Exemplary embodiments of the present invention will be more clearly apparent from the following detailed description taken in conjunction with the accompanying drawings in which.

DETAILED DESCRIPTION OF EXEMPLARY EMBODIMENTS

Hereinafter, the present invention will be described in detail by explaining exemplary embodiments thereof with reference to the attached drawings. Like reference numerals in the drawings denote like elements.

Figure 2:
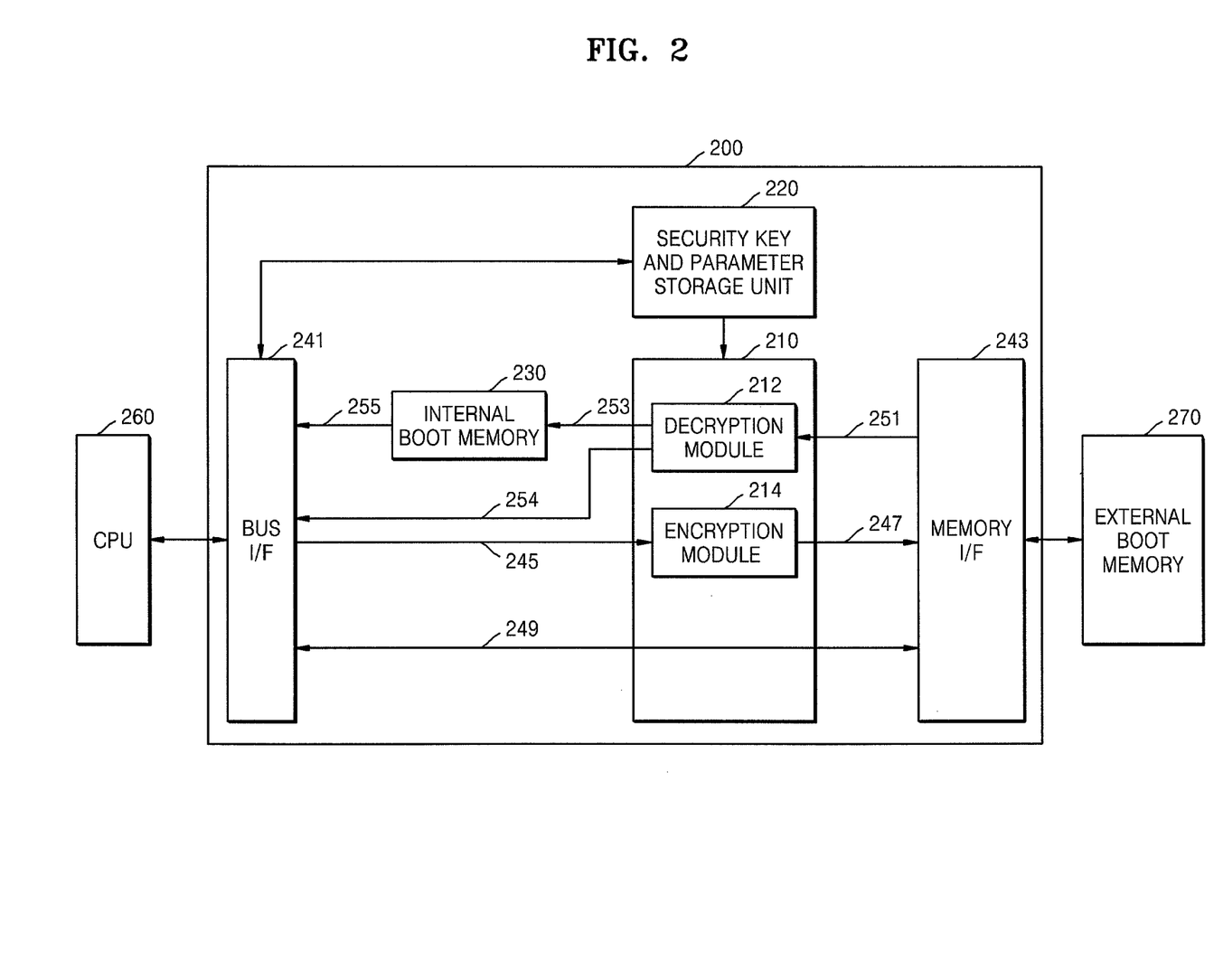
FIG. 2 illustrates a memory device according to an exemplary embodiment of the present invention.

FIG. 2 illustrates a memory device according to an exemplary embodiment of the present invention. Referring to FIG. 2, the memory device includes a memory controller 200, which includes a security key and parameter storage unit 220 and a security engine 210.

The security key and parameter storage unit 220 stores a security key and a parameter which are used during encryption or decryption. The security key and parameter storage unit 220 may store a plurality of security keys and a plurality of parameters. The security keys and parameters may be set differently according to which programs are to be executed, and program users may generate and set the security keys and the parameters.

The security keys and parameters may be set according to a booting operation purpose or a processor function. For example, a plurality of security keys and parameters may be stored for respective application programs (for example, a schedule management program, an Excel application program, a Power Point application program, etc.) or booting programs. For example, if five processors are present, five different security keys and five different parameters may be stored.

The security key and parameter storage unit 220 selects and outputs one of the security keys and one of the parameters in response to a control signal output from a central processing unit (CPU) 260. For example, if the CPU 260 has instructed a schedule management program to be executed, the security key and parameter storage unit 220 selects and outputs a security key and a parameter that correspond to the schedule management program. The selection and output by the security key and parameter storage unit 220 will be described later in greater detail with reference to FIG. 4.

The security key and parameter storage unit 220 may store the security keys and parameters by using electric fuses. The security keys and parameters may be all represented as binary data. For example, a closed fuse may correspond to a binary 1 or logic high and an open fuse may correspond to a binary 0 or a logic low. Binary data may be stored as security keys or security parameters in the security key and parameter storage unit 220 by setting the corresponding states of each of the electric fuses.

The security key and parameter storage unit 220 may be a programmable non-volatile memory device. Examples of the programmable non-volatile memory device include a NOR flash device. For example, the security key and parameter storage unit 220 may be a programmable NOR flash memory device. When a security key value or a parameter value is changed, a programmable non-volatile memory device does not have to be replaced, and only has to be programmed to the changed security key value or parameter value.

In a security operation mode, the security engine 210 receives encrypted data from an external boot memory 270. Then, the security engine 210 decrypts the received data by using a security key and a parameter output from the security key and parameter storage unit 220 and outputs the decrypted data to the CPU 260.

In a security operation mode, the security engine 210 encrypts data received from the CPU 260 by using a specific security key and a specific parameter stored in the security key and parameter storage unit 220. The encrypted data is transmitted to the external boot memory 270. Then, the external boot memory 270 stores the encrypted data. The security engine 210 may perform such an encryption when boot data or a boot code of a processor that requires a security operation has been changed. When boot data or a boot code is newly added, a security key and a parameter that correspond to the newly added boot data or boot code may be stored in the security key and parameter storage unit 220.

The CPU 260 transmits the changed boot data or boot code to the security engine 210 or to an encryption module 214. Then, the security engine 210 or the encryption module 214, encrypts the changed boot data or boot code by using the security key and parameter stored in the security key and parameter storage unit 220. When new boot data or a new boot code is not transmitted, but existing boot data or an existing boot code is changed, the existing security key and parameter may be used.

A determination as to whether the security engine 210 performs encryption (or decryption) or not is made under the control of the CPU 260. For example, the security engine 200 may perform an encryption or a description in response to a control signal from the CPU 260. When a booting operation or a boot data changing operation of a processor that requires security determined by the CPU 260 is needed, the CPU 260 may command the security engine 210 to perform an encryption or decryption operation.

When booting of a processor that does not require security is needed, encryption is not performed. The corresponding boot data or boot code of the processor that does not require security is not encrypted and is stored in the external boot memory 270. Accordingly, the unencrypted boot data or boot code is transmitted to the CPU 260 via a signal line 249. The unencrypted boot data or boot code bypasses the security engine 210 without encryption or decryption.

The security engine 210 may include a decryption module 212 and the encryption module 214. The decryption module 212 decrypts the encrypted data received from the external boot memory 270. The encryption module 214 encrypts the data received from the CPU 260. The decryption module 212 may perform various decryption algorithms. The encryption module 214 may perform various encryption algorithms.

The decryption module 212 and the encryption module 214 may be configured to perform decryption and encryption, respectively, only in the security operation mode. The memory controller 200 may further include an internal boot memory 230.

The internal boot memory 230 may temporarily store decrypted data and may then output the decrypted data in units of a data size required by the CPU 260. The decrypted data is data output by the security engine 210 or by the decryption module 212, and is transmitted by the security engine 210 via a signal line 253.

The CPU 260 may command encryption or decryption to be performed on data in units of a predetermined data size (for example, 128 bits). The CPU 260 may randomly access the external boot memory 270. Accordingly, data output from the external boot memory 270 may not be the predetermined data size required by the CPU 260. Therefore, the internal boot memory 230 can temporarily store the data output from the external boot memory 270, and when the data size required by the CPU 260 is collected, the external boot memory can output the collected data.

For example, the CPU 260 may command encryption or decryption to be performed in units of 248 bits, and the external boot memory 270 may transmit data in units of 128 bits. In this example, the internal boot memory 230 temporarily stores the 128-bit data. When 248-bit data is collected, the internal boot memory 230 outputs the 248-bit data to the CPU 260.

The memory controller 200 may further include a bus interface (I/F) 241 which performs data transmission and reception together with the CPU 260. The bus I/F 241 transmits data received from the CPU 260 to each of a plurality of intellectual property (IP) blocks included in the memory controller 200. The bus I/F 241 transmits data output from each IP block of the memory controller 200 to the CPU 260.

Here, the IP block may denote a functional block (for example, a semiconductor design module) designed to be reused with an independent function during the design of a semiconductor integrated circuit (IC). For example, the IP block may denote a block in which a function required to construct a semiconductor logic circuit is organized in a hardware or software state. In FIG. 2, the IP blocks included in the memory controller 200 may be the internal boot memory 230, the security engine 210, and the security key and parameter storage unit 220.

The memory controller 200 may further include a memory I/F 243, which performs data transmission and reception together with the external boot memory 270.

The memory I/F 243 transmits data received from the external boot memory 270 to each of the IP blocks of the memory controller 200. The memory I/F 243 also transmits data received from the IP blocks of the memory controller 200 to the external boot memory 270.

The CPU 260 may control all operations (for example, data output, data storage, etc.) of the memory controller 200 and the external boot memory 270. The external boot memory 270 stores encrypted boot data and an encrypted boot code, or unencrypted boot data and an unencrypted boot code. Hereinafter, the encrypted boot data and the encrypted boot code are referred to as encrypted data, and the unencrypted boot data and the unencrypted boot code are referred to as unencrypted data. The external boot memory 270 stores the encrypted data and the unencrypted data separately. The encrypted data may be boot data of a processor that requires security, and the unencrypted data may be boot data of a processor that does not require security.

Figure 3A:
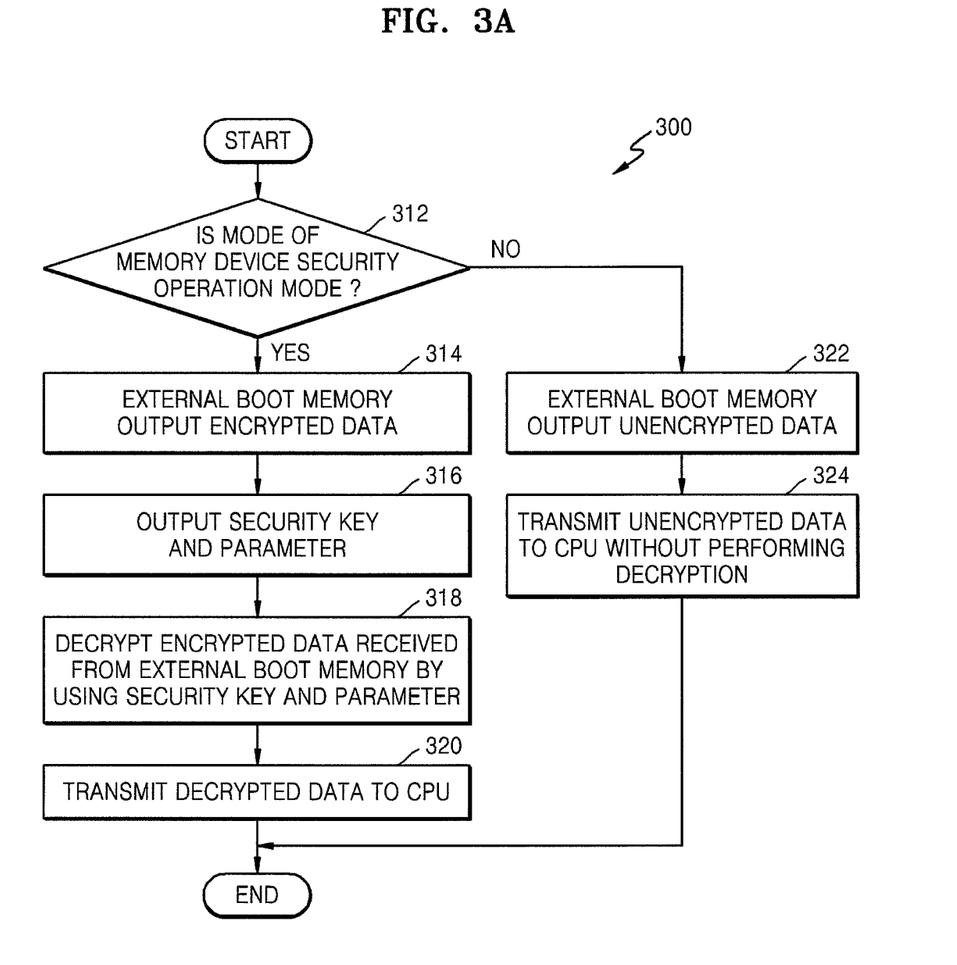
FIG. 3A is a flowchart illustrating an exemplary operation of the memory device illustrated in FIG. 2.

FIG. 3A is a flowchart illustrating an exemplary operation 300 of the memory device illustrated in FIG. 2. The operation 300 of the memory device illustrated in FIG. 2 will now be described in detail with reference to FIGS. 2 and 3A. Referring to FIG. 3A, the external boot memory 270 transmits stored data (that is, boot data or a boot code) to the CPU 260 via the memory controller 200 in response to a request of the CPU 260 for data output.

The CPU 260 accesses the external boot memory 270 and requests the external boot memory 270 to output data. In operation 312, the security engine 210 determines whether a mode of the memory device is a security operation mode. For example, it is determined whether a processor desired to be operated by the CPU 260 requires a security operation.

If the mode of the memory device is the security operation mode, the external boot memory 270 outputs encrypted data, in operation 314. The encrypted data is encrypted boot data or an encrypted boot code. The memory controller 200 accesses the external boot memory 270 and controls the external boot memory 270 to output the encrypted data.

In operation 316, the security key and parameter storage unit 220 outputs a security key and a parameter that correspond to the desired processor. In operation 318, the security engine 210 decrypts the encrypted data received from the external boot memory 270, by using the security key and the parameter. In operation 320, the decrypted data obtained by the security engine 210 is transmitted to the CPU 260. The decrypted data may be temporarily stored in the internal boot memory 230 and then transmitted to the CPU 260. Alternatively, the decrypted data may be transmitted to the CPU 260 via a signal line 254. If the mode of the memory device is not the security operation mode, the external boot memory 270 outputs unencrypted data, in operation 322. The unencrypted data is transmitted to the security engine 210 via the memory I/F 243.

In operation 324, the security engine 210 transmits the unencrypted data received from the external boot memory 270 to the CPU 260 without performing decryption on the unencrypted data. Since the unencrypted data is not encrypted, decryption is not needed. Since the unencrypted data is boot data or a boot code of a processor that does not require security, the unencrypted data may be input or output without security. Thus, the unencrypted data output from the external boot memory 270 is transmitted to the CPU 260 via the signal line 249.

Figure 3B:
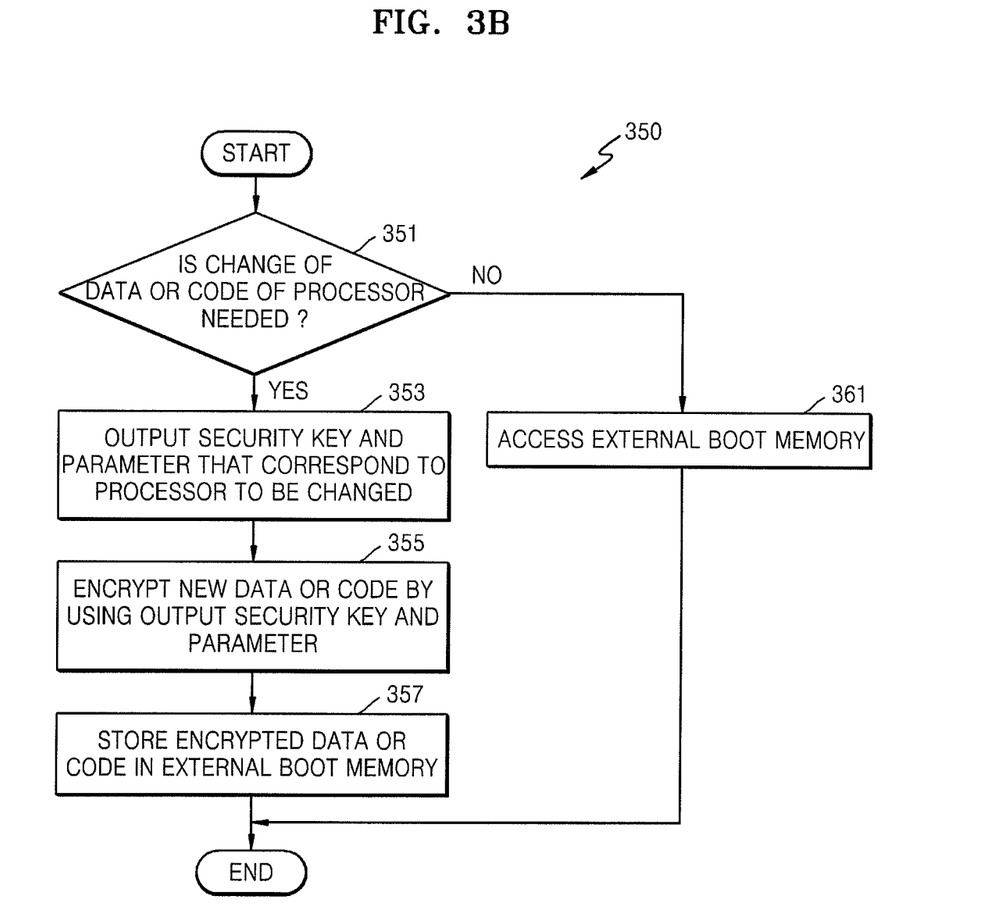
FIG. 3B is a flowchart illustrating another exemplary operation of the memory device illustrated in FIG. 2.

FIG. 3B is a flowchart illustrating an exemplary operation 350 of the memory device illustrated in FIG. 2, which is performed when a change of boot data or a boot code of a processor is needed. The operation 350 of the memory device illustrated in FIG. 2 will now be described in detail with reference to FIGS. 2 and 3B.

In operation 351, the CPU 260 determines whether a change of data or a code of a processor is needed. The data or the code may be boot data or a boot code. If the change of the data or code of the processor is needed, a security key and a parameter that correspond to the processor to be changed are output, in operation 353. The security key and the parameter are output from the security key and parameter storage unit 220 under the control of the CPU 260. The security key and parameter storage unit 220 selects at least one security key and at least one parameter from among a plurality of security keys and a plurality of parameters that are stored therein, under the control of the CPU 260.

Operations 353, 355, and 357 may be performed only in the security operation mode. In modes other than the security operation mode, even when the boot data or the boot code is neither encrypted nor decrypted, security of the memory device of FIG. 2 is not threatened. Accordingly, in modes other than the security operation mode, operations 353, 355, and 357 are not performed.

In operation 355, data newly output from the CPU 260 (e.g., changed data or new data) is encrypted using the security key and parameter output from the security key and parameter storage unit 220. The encryption may be performed in the encryption module 214 of the security engine 210. In operation 357, the encrypted new data is output to the external boot memory 270 via the memory I/F 243 and stored in the external boot memory 270. However, if the data or code does not need to be changed, the CPU 260 accesses the external boot memory 270 via the memory controller 200, in operation 361.

Figure 4:
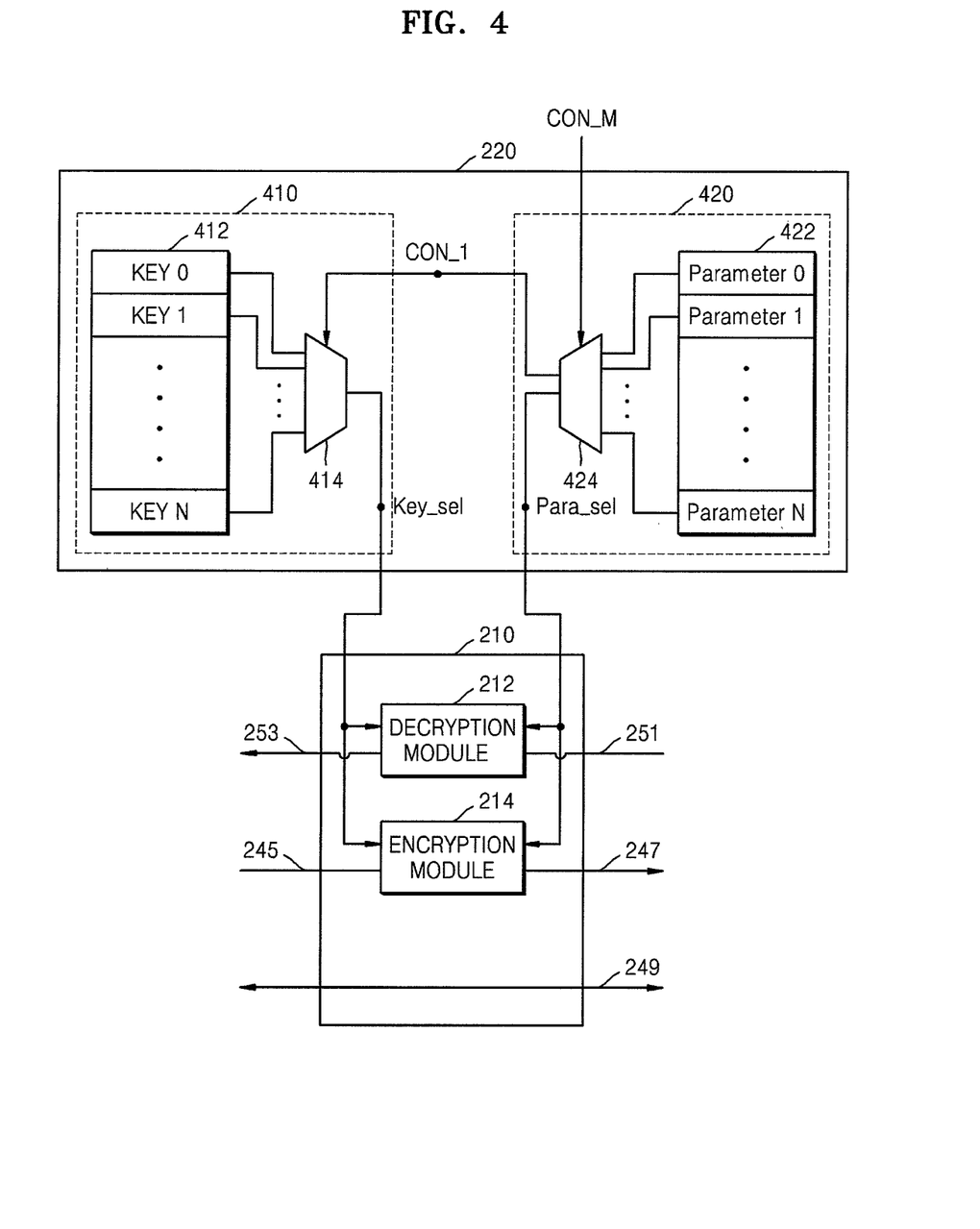
FIG. 4 is a circuit diagram of an exemplary embodiment of a security key and parameter storage unit of the memory device illustrated in FIG. 2.

FIG. 4 is a circuit diagram of an exemplary embodiment of the security key and parameter storage unit 220 of the memory device illustrated in FIG. 2. Referring to FIG. 4, the security key and parameter storage unit 220 includes a security key storage and output unit 410 and a parameter storage and output unit 420.

The parameter storage and output unit 420 includes a parameter storage block 422 and a parameter selection unit 424. As illustrated in FIG. 4, the parameter selection unit 424 may be a multiplexer MUX. The parameter storage block 422 stores a plurality of parameters. FIG. 4 illustrates an example where (N+1) parameters, namely, Parameter0, Parameter1, through to Parameter N, are stored.

The parameter selection unit 424 selects at least one parameter and outputs the selected parameter as a signal Para_sel, in response to a control signal CON_M output from the CPU 260. The control signal CON_M indicates the output of a parameter corresponding to a specific processor or program. The CPU 260 may output an address signal as the control signal CON_M. The address signal may indicate a specific address in the parameter storage block 422, and the parameter storage block 422 outputs a parameter stored in the specific address.

The security key storage and output unit 410 includes a security key storage block 412 and a security key selection unit 414. As illustrated in FIG. 4, the security key selection unit 414 may be a MUX. The security key storage block 412 stores a plurality of security keys. FIG. 4 illustrates an example where (N+1) security keys, namely, key 0, key 1, through to key N, are stored.

The security key selection unit 414 selects at least one security key and outputs the selected security key as a signal Key_sel, in response to a control signal CON_1. The control signal may be the same as the signal Para_sel. A security key and a parameter form a pair, because a security key and a parameter corresponding to a specific processor or program form a pair. Accordingly, when one parameter has been output, a security key with which the output parameter forms a pair may be controlled to be output.

The decryption module 212 and the encryption module 214 each receive the security key, namely, the signal Key_sel, and the parameter, namely, the signal Para_sel, from the security key and parameter storage unit 220 and perform decryption and encryption on the received security key and parameter, respectively.

Figure 5:
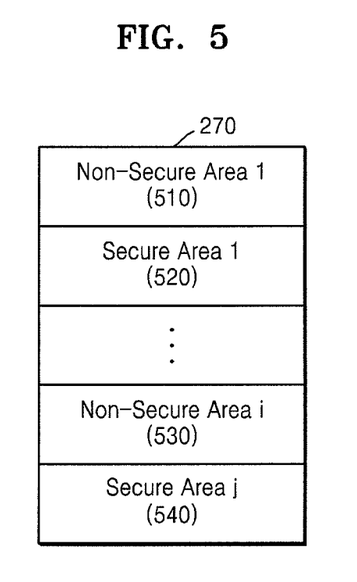
FIG. 5 illustrates an exemplary embodiment of external boot memory of the memory device illustrated in FIG. 2.

FIG. 5 illustrates an exemplary embodiment of the external boot memory 270 illustrated in FIG. 2. Referring to FIG. 5, the external boot memory 270 includes a plurality of storage spaces 510, 520, 530, and 540. The external boot memory 270 may include non-secure areas and secure areas.

In a non-secure area, boot data or a boot code of a processor that does not require a security operation is stored. Since a security operation is not required, data stored in the non-secure area may be unencrypted data.

In a secure area, boot data or a boot code of a processor that requires a security operation is stored. Since a security operation is required, data stored in the secure area may be encrypted data.

In a memory controller according to one or more embodiments of the present invention, decryption is internally performed on data, and the decrypted data is transmitted directly to a CPU. This prevents the decrypted data from leaking outside a computer system including the memory controller and the CPU. Thus, high security may be maintained.

In a memory device including the memory controller according to one or more embodiments of the present invention, an external boot memory which is exposed to the outside of the memory controller stores encrypted boot data (or an encrypted boot code). Thus, data encrypted and stored in the external boot memory cannot be decrypted without knowledge of a security key. Since the security key is stored in the memory controller, it is not externally exposed. Thus, high security may be maintained.

Moreover, in contrast to the conventional memory device of FIG. 1, the memory device according to one or more embodiments of the present invention need not transmit data from a boot memory to the CPU via a special RAM. Thus, the time required to perform encryption or decryption and data transmission may be reduced. Due to the reduction of the time, an operational speed of the memory device may be increased, and power consumption may be reduced.

While the present invention has been particularly shown and described with reference to exemplary embodiments thereof, it will be understood that various changes in form and details may be made therein without departing from the spirit and scope of the disclosure.

What is claimed is:

1. A memory controller comprising:
    a security key and parameter storage unit storing a plurality of security keys and a plurality of parameters that are used during encryption and decryption, wherein the security key and parameter storage unit selects one of the security keys and one of the parameters based on a control signal received from a central processing unit CPU; and
    in a security operation mode, a security engine configured to receive encrypted data stored in an external boot memory, decrypt the received encrypted data by using the selected security key and parameter, and output the decrypted data to the CPU, and configured to encrypt data transmitted from the CPU by using the selected security key and parameter, and output the encrypted data to the external boot memory.

2. The memory controller of claim 1, wherein the external boot memory is disposed external to the memory controller, and the security key and parameter are transferred only within the memory controller from the security key and parameter storage unit to the security engine.

3. The memory controller of claim 1, further comprising a memory interface which performs data transmission and reception together with the external boot memory.

4. The memory controller of claim 1, further comprising a bus interface which performs data transmission and reception together with the CPU.

5. The memory controller of claim 1, wherein in modes other than the security operation mode, the security engine receives unencrypted data stored in the external boot memory and transmits the unencrypted data to the CPU.

6. The memory controller of claim 1, wherein in modes other than the security operation mode, the security engine transmits unencrypted data transmitted from the CPU and transmits the unencrypted data to the external boot memory.

7. The memory controller of claim 1, further comprising an internal boot memory temporarily storing the decrypted data and outputting stored data in units of a data size required by the CPU.

8. The memory controller of claim 1, wherein the plurality of security keys are different according to booting purposes or application programs to be executed, and the plurality of parameters are different according to the booting purposes or the application programs to be executed.

9. The memory controller of claim 1, wherein the security key and parameter storage unit includes at least one electric fuse to store the security keys and the parameters.

10. The memory controller of claim 1, wherein the security key and parameter storage unit is a programmable non-volatile memory device.

11. The memory controller of claim 1, wherein the security engine comprises:
    an encryption module configured to encrypt data transmitted from the CPU; and
    a decryption module configured to decrypt the encrypted data transmitted from the external boot memory.

12. The memory controller of claim 11, wherein the security engine determines whether to perform one of the encryption and the decryption in response to a second control signal from the CPU.

13. The memory device of claim 1, wherein the external boot memory comprises:
    a secure area storing the encrypted data or boot code; and
    a non-secure area storing the unencrypted data or boot code.

14. A memory device comprising:
    an external boot memory configured to separately store one of encrypted data and an encrypted boot code and one of unencrypted data and an unencrypted boot code; and
    in a security operation mode, a memory controller configured to receive the encrypted data or boot code stored in the external boot memory, decrypt the received encrypted data or boot code by using an internally stored security key and an internally stored parameter, and output the decrypted data to a CPU and configured to encrypt data transmitted from the CPU by using the internally stored security key and the internally stored parameter, and output the encrypted data to the external boot memory.

15. The memory device of claim 14, wherein the memory controller comprises:
    a security key and parameter storage unit storing at least one security key and at least one parameter that are used during encryption or decryption; and
    a security engine receiving the encrypted data or boot code stored in the external boot memory, decrypting the received encrypted data or boot code by using the at least one security key and the at least one parameter, and outputting the decrypted data or boot code to the CPU, in the security operation mode.

16. A memory device comprising:
    a storage unit storing a plurality of security keys and parameters, each parameter corresponding to one of a plurality of programs, wherein the storage unit is configured to select one of the plurality of parameters in response to a control signal, and to select one of the plurality of security keys in response to the selected parameter; and
    a security engine that is configured to decrypt a boot code of a program stored in an external boot memory that corresponds to the selected parameter using the selected security key for output to a central processing unit (CPU),
    wherein the storage unit includes multiplexers to select the security key and the parameter.

17. The memory device of claim 16, wherein the security engine is further configured to encrypt replacement boot code from the CPU using the selected security key and to replace the boot code of the program stored in the external boot memory that corresponds to the selected parameter using the encrypted replacement boot code.

18. The memory device of claim 17, wherein the security engine is further configured to pass the boot code between the CPU and the external boot memory without encryption or decryption.

19. The memory device of claim 16, wherein the multiplexers comprises:
- a first multiplexer receiving the parameters and the control signal, and outputting the selected parameter based on the control signal; and
- a second multiplexer receiving the security keys and the output selected parameter, and outputting the selected security key based on the output selected parameter.

\* \* \* \* \*